United States Patent [19]
Kim

[11] Patent Number: 5,943,439
[45] Date of Patent: Aug. 24, 1999

[54] METHOD AND APPARATUS FOR GENERATING AN IMAGE AREAS USING HALFTONE PROCESSING, BINARY CONTOURING, AND DITHERING CONVERSION TECHNIQUES

[75] Inventor: Jun Man Kim, Kyoungki-do, Rep. of Korea

[73] Assignee: Hyundai Electronics Ind, Co., Ltd., Kyoungki-Do, Rep. of Korea

[21] Appl. No.: 08/777,811

[22] Filed: Dec. 31, 1996

Related U.S. Application Data

[63] Continuation-in-part of application No. 08/245,739, May 18, 1994, abandoned.

[30] Foreign Application Priority Data

May 19, 1993 [KR] Rep. of Korea ......................... 93-8592

[51] Int. Cl.⁶ ............................ G06K 9/34; H04N 1/403; H04N 1/405
[52] U.S. Cl. .......................... 382/176; 382/237; 382/266; 382/270; 358/457; 358/462
[58] Field of Search ..................................... 382/176, 254, 382/266, 237, 270; 358/462, 447, 456, 457, 466

[56] References Cited

U.S. PATENT DOCUMENTS

5,644,366   7/1997   Ushida et al. ........................... 382/176

Primary Examiner—Scott Rogers
Attorney, Agent, or Firm—Wenderoth, Lind & Ponack, L.L.P.

[57] ABSTRACT

A method and apparatus for separating picture image areas in facsimile machines, scanners, and other picture processing equipment, and more particularly to a method and apparatus for separating picture regions by extracting features of graphic image and characters includes a vertical contouring circuit for producing vertical contour data by combining vertical components of an original picture and binary picture data; a horizontal contouring circuit for producing horizontal contour data from horizontal components of the binary picture data; a logic combiner for combining outputs from the vertical and horizontal contouring circuits and a halftone picture; a mode discriminator for selecting between a binary picture and contouring mode; an image area separator for separating image areas with an output from the logic combiner and a halftone picture, and a counter for executing pixel counting from a halftone picture to determine the probability of the presence of a character.

5 Claims, 7 Drawing Sheets

(A') ① `0 0 0 1 1 1 1 1 1 0` — nth STD (FIG. 5A)

(B') ② `1 1 1 1 1 1 0 0 0 0` — (n+1)th STD (FIG. 5A)

(C') ③ (①⊕②) `1 1 1 0 0 0 1 1 1 0` — V. Countour (n+1)th = nth STD ⊕ (n+1)th STD (C'a) ④ — Shifted STD (n+1)th (D') ④ (②⊙④) — H. Contour (n+1)th (D'a) ⑧ — (n+1)th H/T (FIG. 5E)

(D'b) ⑤ (④⊕⑧) — Partial Combine (D'c) ⑥ (③⊕⑤) — Combine H/T & Contour (FIG. 5F)

(E') ⑦ (④⊕③) — Contour Output (FIG. 5B)

(F') ② — (n+2)th STD (FIG. 5A)

(G') ③ (①⊕②) — V. Contour (n+2)th = (n+1)th STD ⊕ (n+2)th STD (G'a) ④ — Shifted STD (n+2)th (H') ④ (②⊙④) — H. Contour (n+2)th (I') ⑦ (④⊕③) — Contour Output (FIG. 5B)

METHOD AND APPARATUS FOR GENERATING AN IMAGE AREAS USING HALFTONE PROCESSING, BINARY CONTOURING, AND DITHERING CONVERSION TECHNIQUES

CROSS-REFERENCE TO RELATED APPLICATIONS

This is a continuation-in-part of application Ser. No. 08/245,739, filed May 18, 1994, and now abandoned.

BACKGROUND OF THE INVENTION

1. Field of the Invention

This invention relates to a method and apparatus for separating image areas in facsimile machines, scanners, and other image processing equipment, and more particularly, to a method and apparatus for separating image regions by extracting features of graphic images and characters.

2. Description of the Related Art

Figure 1:
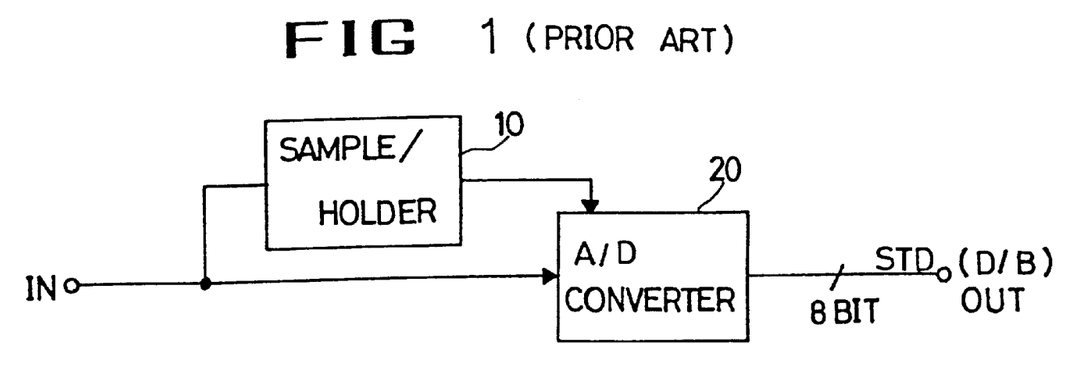
FIG. 1 is a block diagram of a conventional picture processing apparatus.

A conventional picture processing apparatus as shown in the block diagram of FIG. 1 subjects picture data to dither processing. The apparatus includes a sample holder 10 for recording analog data input thereto and an A/D converter 20 for digitizing the data from the sample holder. The digital data is transmitted at a predetermined bit rate and then dithered by software.

Figure 2:
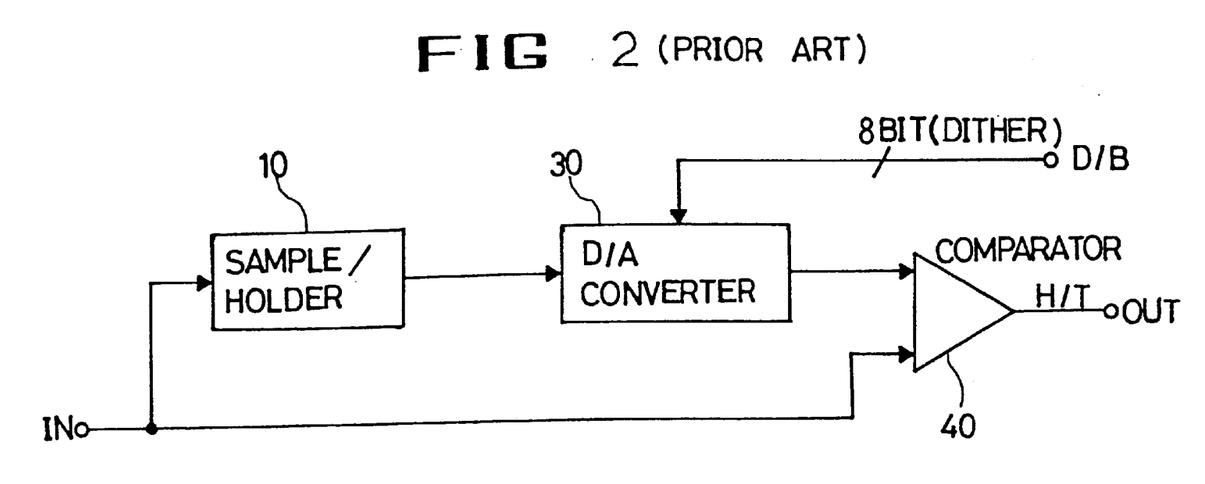
FIG. 2 is a block diagram similar to FIG. 1 but relating to another conventional picture processing apparatus.

Another example of a conventional apparatuses as shown in FIG. 2 includes a sample holder 10, a D/A converter 30 supplied with dither data from a data bus for conversion into an analog form, and a comparator 40 supplied with the analog data from the D/A converter 30 and input data for producing dithered data.

With these conventional picture processor apparatuses, graphic data and characters contained in picture data are indifferently dithered, and while graphic presentations are acceptable, the halftone processing causes the characters to appear dull and unclear.

SUMMARY OF THE INVENTION

To overcome the above mentioned drawback of the prior art, an apparatus and method is provided according to the present invention for separating image areas according to features consisting of graphic data and characters in image data extracted by halftone processing, binary contouring and dithering conversion techniques.

According to the present invention, an apparatus for generating an image comprises: a vertical contour producer for logically combining one horizontal data of an original standard binary image data STD of a set up line and the other horizontal data of the original standard binary image data of a next set up line to produce a vertical contour; a horizontal contour producer comprising a shifter, wherein the horizontal contour producer combines the other horizontal data of the original standard binary image data of the next set up line with a shifted original standard binary image data of the next set up line which is shifted by the shifter a logic combiner for logically combining outputs of the vertical and horizontal contour products and a halftone image data; and an image area transfer circuit for transferring image areas of the half tone image data with horizontal and vertical contouring data combined by the logic combiner.

According to the present invention a method for generating an image is also provided which comprises producing a binary image based on an original image input in the form of horizontal and vertical contours; logically combining the horizontal and vertical contours with halftone image data by using logic gates to effect an image generation and transferring image areas of the halftone image data with the horizontal and vertical image data combined by the logically combining step.

DETAILED DESCRIPTION OF THE PREFERRED EMBODIMENTS

Figure 3:
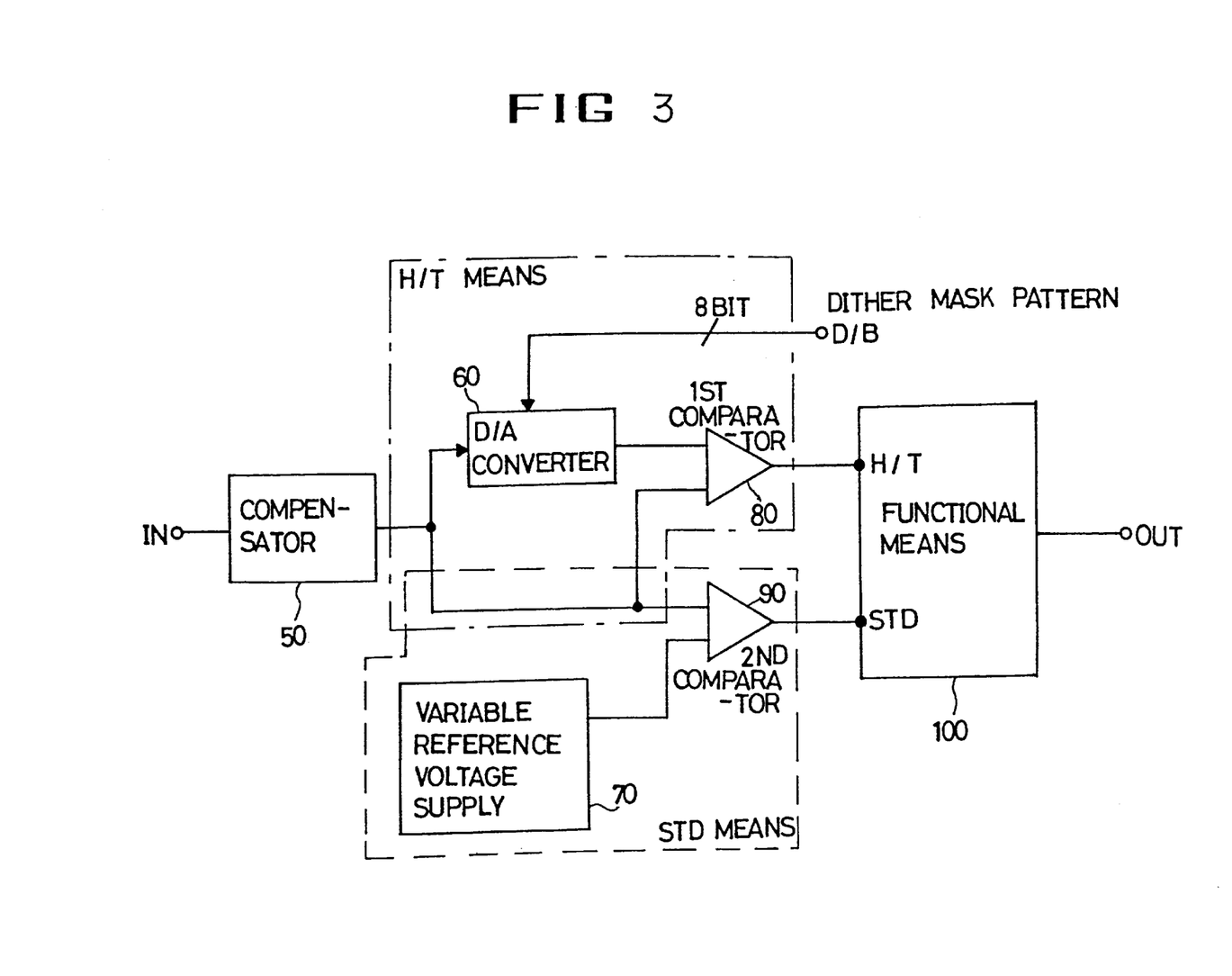
FIG. 3 is a block diagram of a picture processing apparatus in accordance with an embodiment of the present invention.
Figure 4:
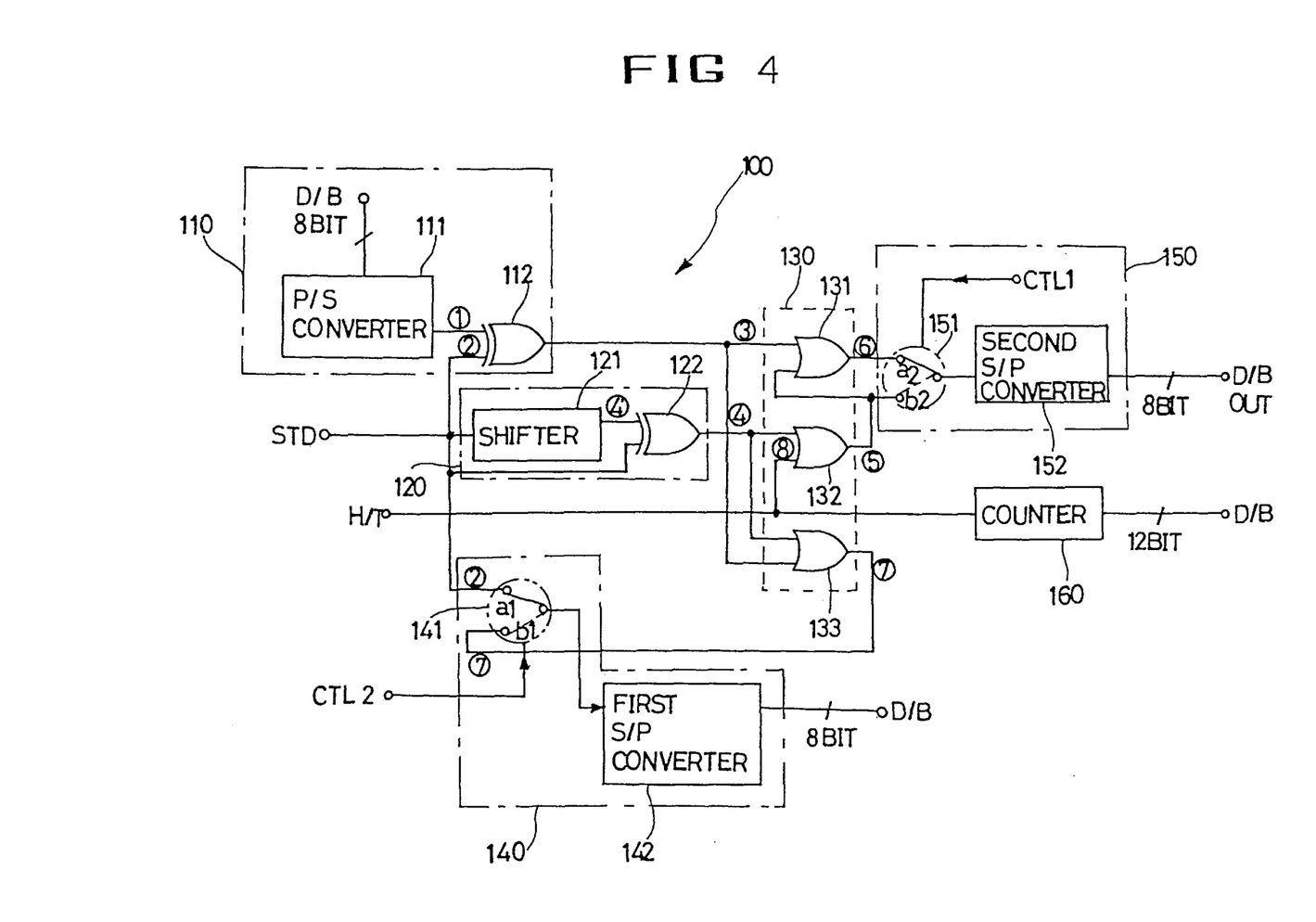
FIG. 4 is similar to FIG. 3, but comprises a more detailed block diagram.
Figure 8:
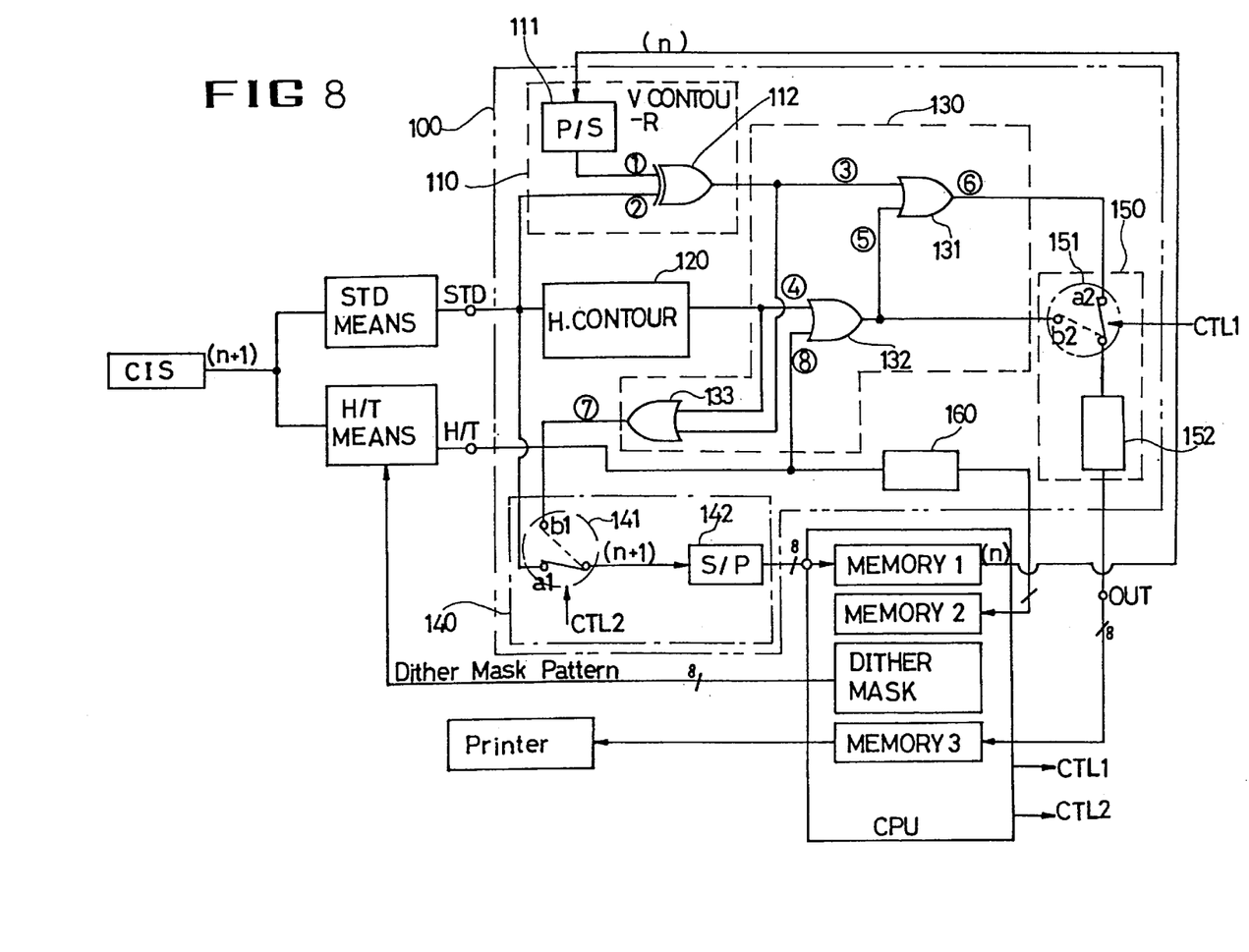
FIG. 8 is a block diagram illustrating an input/output relationship of FIG. 4.

With regard to the drawings, the STD means in FIG. 8 can bee seen in FIG. 3 and the H/T means in FIG. 8 can also been seen in FIG. 3. The functional means 100 in FIG. 3 is illustrated in FIGS. 4 and 8. Output data of the STD means in FIGS. 3 and 8 is standard binary image data STD as in FIGS. 3, 8, 6 and 4, and output data of the H/T means in FIGS. 3 and 8 is halftone image data H/T as in FIGS. 3, 8, 6 and 4.

One embodiment of the invention will be described with reference to FIG. 3. The illustrated picture image area separation apparatus comprises: a compensator 50 for compensating an original picture signal which may be inputted via a scanner; a D/A converter 60 for converting the compensated picture signal into an analog form, and a first and second comparators 80 and 90 for producing a halftone picture and a contour signal, respectively. The latter is produced on the basis of a reference voltage from a variable reference voltage supply 70. A functional means 100 combine the halftone picture from the first comparator and the contour data from the second comparator and includes an internal functional processor for producing an image area-separated data.

The invention, as shown in FIGS. 4 and 8 in more detail, further includes: vertical contouring circuit 110 for producing vertical contour data by combining vertical components of an original picture and binary picture data; horizontal contouring circuit 120 for producing horizontal contour data from horizontal components of the binary picture data; a logic combiner 130 for combining outputs from the vertical and horizontal contouring circuits 110 and 120 and a halftone picture/mode discriminator 140 for selecting between a binary picture and a contouring mode; an image area transfer means 150 for separating image areas with an output from the logic combiner and a halftone picture; and a counter 160 for executing pixel counting from a halftone picture to determine the probability of the presence of a character.

The vertical contouring circuit 110 comprises a parallel/serial converter 111 for changing the vertical component data of an original picture into a serial form and a first exclusive-OR gate 112 for exclusive-ORing an output of the converter 111 with the horizontal data component of the binary picture. The horizontal contouring 120 comprises a shifter 121 for shifting binary picture data, and a second exclusive-OR gate 122. The logic combiner 130 includes three OR gates 131, 132 and 133. The halftone picture/mode discriminator 140 includes a first switch 141 and a first serial/parallel converter 142. The image area transfer means 150 includes a second switch 151 and a second serial/parallel converter 152.

Exemplary data processed by the invention, as shown in FIGS. 5(A)–5(F), include binary picture data A, contour data B, original picture data C, mask pattern data D, halftone data E and image area data F.

Figure 6:
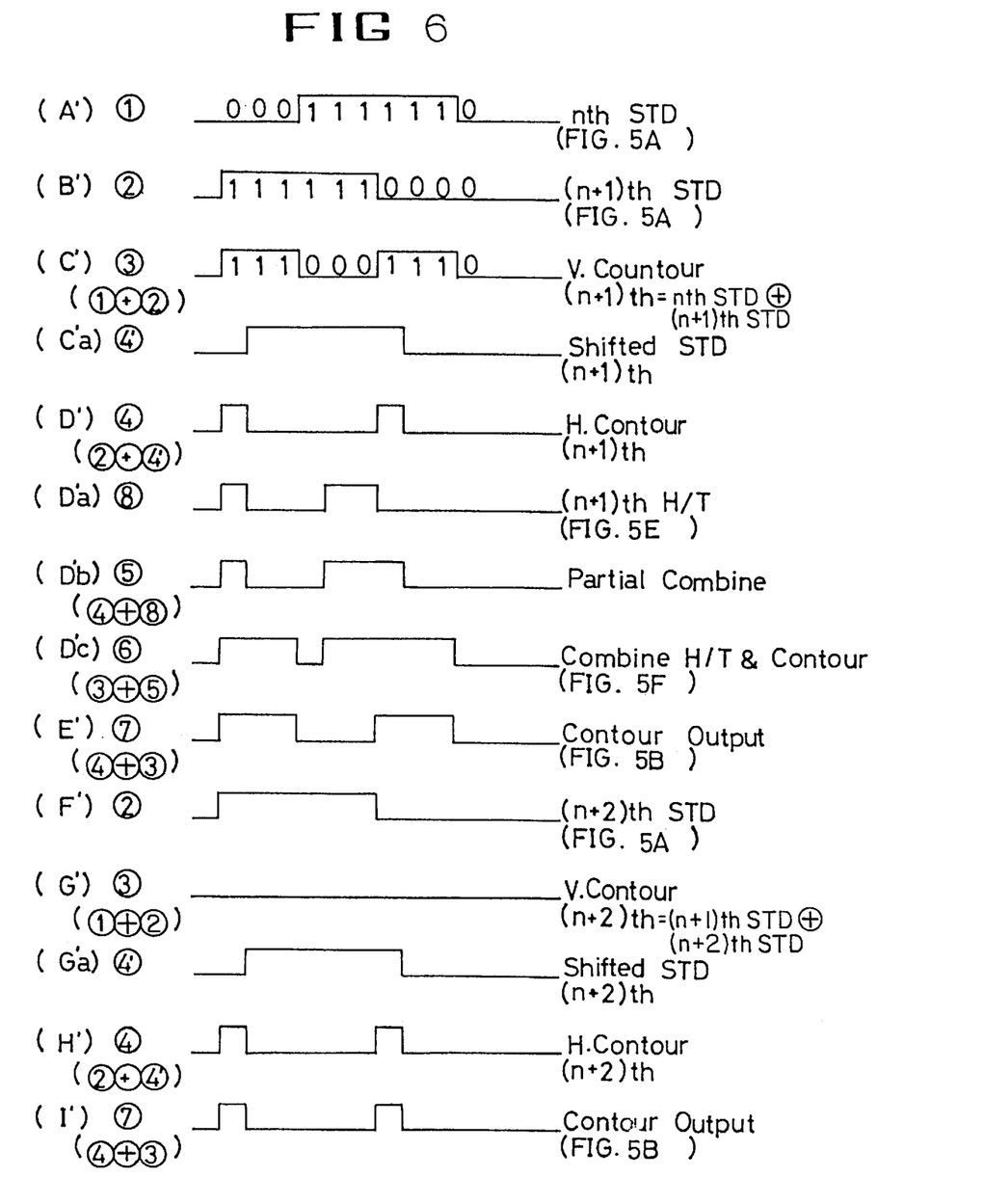
FIG. 6 is a timing chart for the operation of the embodiment shown in FIG. 4.

The operating timing of the various signals in the embodiments of FIGS. 4 and 8 are shown in FIG. 6 and include N-th and (N+1)th signals (A') and (B') from an original picture, vertical and horizontal contour signals (C') and (D'), a composite signal (E') of the signals (C') and (D'), (N+2)th signal (F'), a signal (G') resulting from exclusive-ORing signals (B') and (F'), an (N+2)th contour signal (H') and a composite signal (I') of the signals (G') and (H).

Figure 5A:
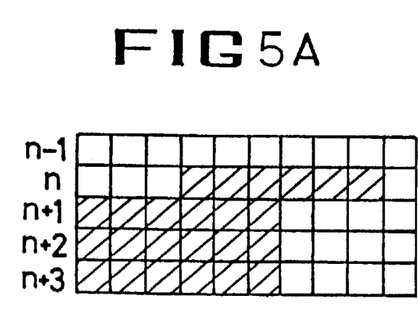
FIGS. 5(A)–5(F) are diagrams of picture data for the understanding of the operation of the embodiment shown in FIG. 4.
Figure 5B:
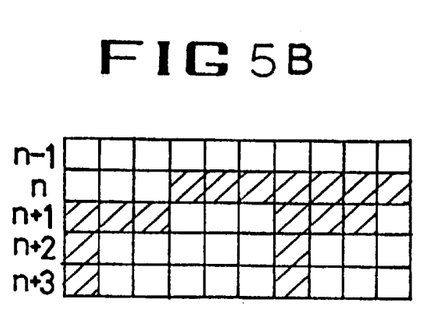

Each time pulse data at nodes ① to ⑧ in FIGS. 4 and 8 can be seen in FIGS. 6A' to 6I'. The time pulse data is based on a standard binary image data of a set up line (n+1) and an example of the standard binary image data with each of the set up lines n−1 to n+3 is illustrated in FIG. 5A. In the FAX image sensing field, the scanned FAX image is sensed by a horizontal line unit which is composed of established pixel units. Line numbers n−1, n, n+1, n+2 and n+3 in FIGS. 5A are with regard to the horizontal standard binary image data lines, and the time chart with regard to the halftone data (such as in FIG. 5E), contour data (FIG. 5B) and image area data (FIG. 5F) are based on each line (n−1, n, n+1, n+2, n+3) data. If a present set up line is a line n+1, a next set up line may be a line n+2. Furthermore, a standard binary image data STD of a set up line n+1 in FIG. 5A may be illustrated with binary digits 1111110000 as in FIG. 6B'. Coinciding with the time chart are line numbers (n) (on a dither mask input node of a v. contouring circuit 110) and (n+1) (on each input node of the STD means and the H/T means) in FIG. 8. The time chart in FIG. 6F' to 6I' are with regard to the nodes ②, ③, ④', ④, and ⑦ of STD of set up lines n+2.

A discussion of the operation follows with reference to FIGS. 5 and 6. The Nth and (N+I) horizontal data signals (A') and (B') from an original picture are supplied to the horizontal contouring circuit 110 via a data bus DB from a memory which is not shown. The vertical data is converted by the parallel/serial converter 111 into a serial form and exclusive-ORed in the gate 112 with binary picture signals STD to produce the signal (C').

The horizontal contouring circuit 120 shifts the binary picture horizontal data (B') with the shifter 121 for a predetermined period and exclusive-ORed together by the second exclusive OR gate 122 to produce the horizontal contour data (D').

The vertical and horizontal contour data and halftone picture data HT are ORed by the logic combiner 130. The second OR gate 132 combines the horizontal contour data and halftone picture data HT. The first OR gate 131 combines the horizontal contour data and the product output from the second OR gate 132. The third OR gate 133 combines the vertical and horizontal contour data.

The mode discriminator 140 selects between the binary picture and contour modes. The first switch 141 therein responds to a control signal CTL2 from a user for the mode selection. The serial/parallel converter 142 converts an output of the switch 141 into a parallel form. The main switching terminal of the switch 141 is a1.

The image area transfer means 150 is supplied with the composite signals from the first and second OR gates 131 and 132 to produce "image area separated data". The second switch 151 responds to a control signal CTLL to switch over the composite signals from the first and second OR gates 131 and 132. The signal output from the second switch is converted by the second serial/parallel converter into a parallel form which is output to the data bus DB.

The meaning of the phrase "image area separated data" relates to the generation of a new image area in the FAX image data field. A general FAX image may be selected from the H/T mode or STD mode, wherein a FAX image based on the H/T mode is good in graphic expression and a FAX image based on the STD mode is good in character expression. That is, the graphic image part of the FAX image can't be expressed well in a STD mode, and the character image part of the FAX image can't be expressed well in a H/T mode.

Accordingly, a present invention generates a new FAX image mode combining a contouring art (for the good character image) and an H/T procedure art, separated before being combined with each other, the combined data such as the output data of the transfer means 150 denoted as image area-separated data herein.

The counter 160 interprets horizontal lines, whereby horizontal line data is segmented into four segments for determining the probability of the character presence therein and is converted with dither mask data for minimizing pixel loss in the character areas.

Figure 5C:
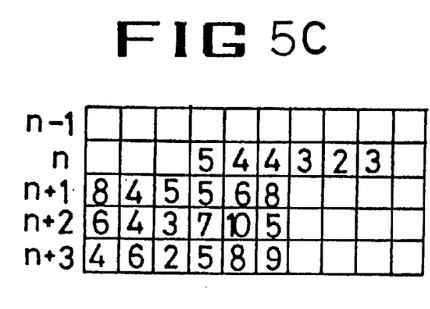

The original picture data (output of the CIS (contact Image Sensor) in FIG. 8) may be in the form of FIG. 5C. That is, each pixel level of a set up line n+1 may be 8455680000. However, the analog data from the CIS may be converted into a serial standard binary image data of 1111110000 as in FIG. 5A through the STD means.

The vertical component data (v. contour data) (such as in FIG. 6C') may be produced at the node ③ (in FIGS. 4 and 8) by exclusive-ORing (nodes ③=①+②) a horizontal standard binary image data (such as FIG. 6A' on node ②) from memory 1 (in FIG. 8) of a set up line (for example line n) with a horizontal standard binary image data (such as FIG. 6B' on node ①) from STD means (in FIG. 8) of a next set up line (for example line n+1).

The image area transfer mean 150 is thus to transfer the combined output (regarded as the new image area mode) into a memory 3 (as in FIG. 8). (In the second switch 151, the main switching terminal is a2 and a switching terminal b2 is for another optional image mode.

Reference is now made to FIGS. 5(A)–5(F) where the mask pattern D of 5 by 5 pixels with which an original picture data C are converted to obtain halftone data E. When the pixels in the original picture data C have smaller values than those in the mask pattern D, they will be canceled. For instance, a pixel at line 2, column 8 in original picture data C is of a value of "2" will be canceled as shown in the data E as the pixel in the corresponding position in the mask D has a higher value of "9". The data E and B are combined into an image area data F.

Figure 5D:
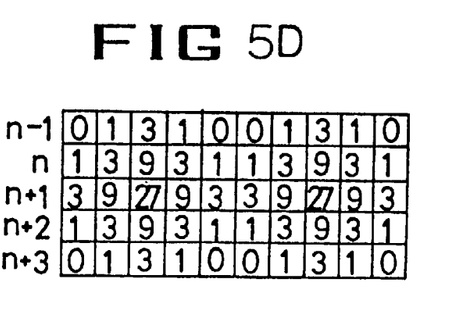
Figure 5E:
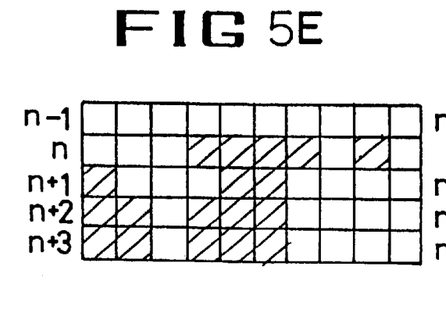
Figure 5F:
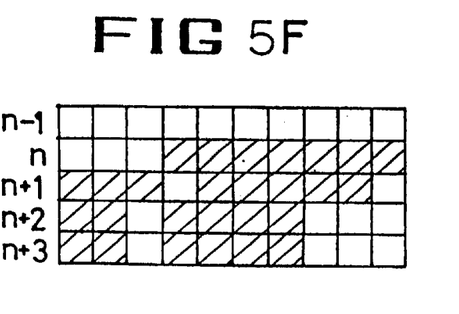

Half tone data may be produced by dithering the original image data from the CIS as in FIGS. 3 and 8. The mask pattern in FIG. 5D is a dither mask pattern in FIGS. 3 and 8. Accordingly, the half tone may be generated from the half tone means in FIGS. 3 and 8 using the dither mask pattern.

Figure 7:
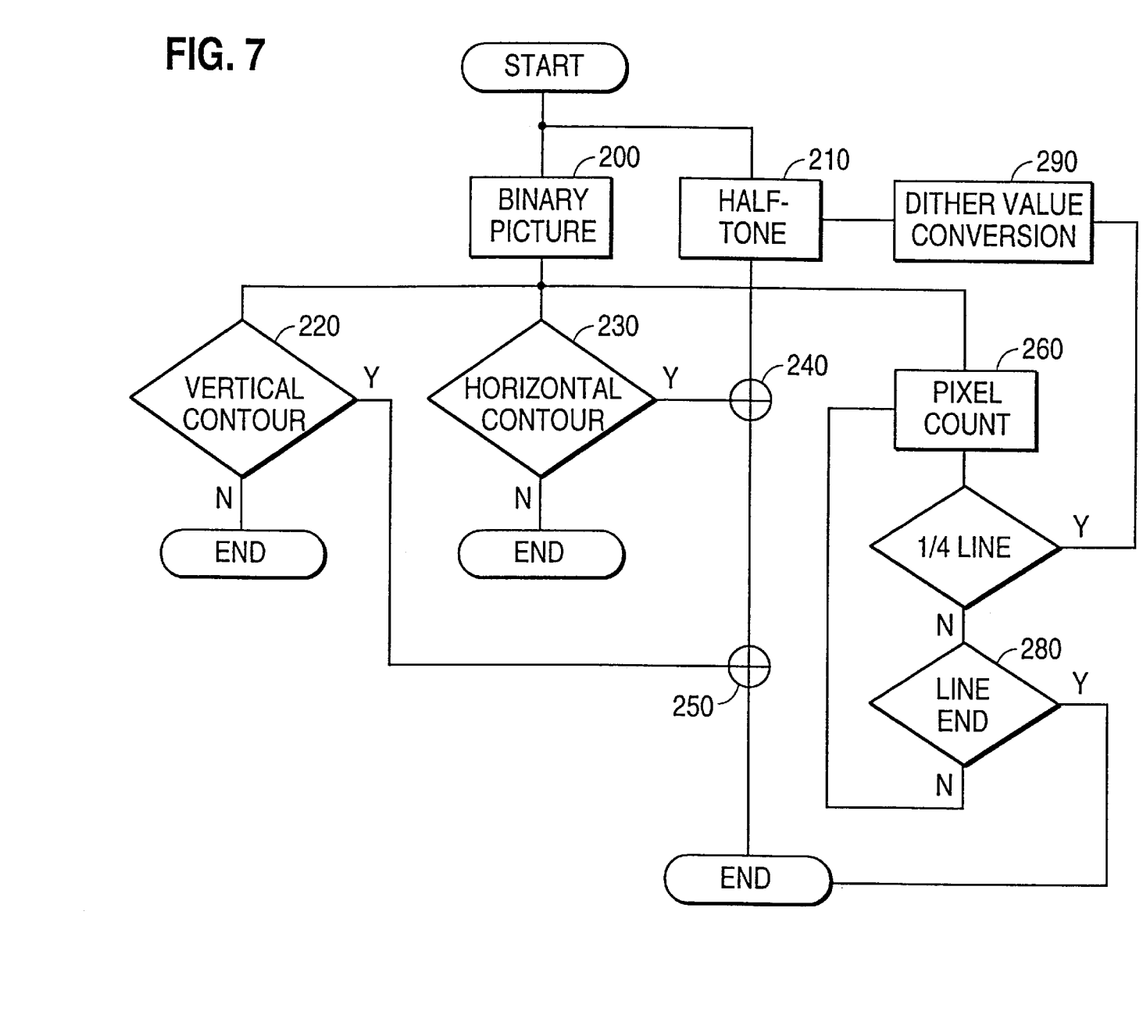
FIG. 7 is a flowchart of a method embodied by the invention.

To summarize the above-described process for separating image areas as shown in the flowchart of FIG. 7, halftone data is produced from an original inputted picture and the binary picture data, where the binary picture data is produced in the form of the vertical and horizontal contours as shown in steps 200 to 230 thereof. The vertical and horizontal contour data thus obtained are combined with the halftone data into image area data as shown in steps 240 and 250. The count value of a black pixel each ¼ line is read from the binary picture and an appropriate mask data or threshold values are adjusted for changing dither values, as shown in steps 260 through 290.

This invention thus described is directed to providing a method and apparatus for separating picture image areas to reproduce both graphics and characters clearly for a G3 facsimile machine at a low cost.

Generally, the picture image areas have been separated by the error diffusion method, wherein a DSP (Digital Signal Processor) is required to process such images, increasing the product cost.

In the present invention, however, the picture image areas are separated logically by using halftone processing, binary contouring and dithering conversion and this logic system can be achieved at a low cost.

In the present invention, from a standard mode data, the halftone mode data is extracted by random search to reproduce graphics, while the contour mode data is extracted to reproduce the outlines of the characters, so that not only the graphics but also the characters, having thin lines and points which have been reproduced little or very vaguely before, can be reproduced on a facsimile transmission clearly.

The picture image areas are separated as above. When it is assumed that the contour image is $a_i b_i$, the halftone image is $C_i D_i$ and the output is Y, the following formulas are deduced:

$$Y = a_i b_i + C_i D_i, \qquad ①$$

$$a_i b_i \times a_i b_i >> (C_i D_i)^2, \qquad ②$$

and $$a_i b_i \times a_i b_i \geq (C_i D_i) \times (C_i D_i). \qquad ③$$

In more detail, as shown in the equation 1, the desired output image comes from adding the separate contour image and halftone image together. The contour image $a_i b_i$ is in relation of compensation for $C_i D_i$. Therefore, in formula 2, the contour image has no influence on the halftone image, and in formula 3, the contour image has the maximum influence on the text.

The desired output images can be achieved by combining the halftone images and the contour images separated as above together.

As should be apparent from the foregoing explanation of the embodiment of the present invention, the vertical and horizontal contours are obtained from an original picture and combined with the binary picture and halftone data for separating graphics and character from each other by means of appropriate control signals. Definition of a picture data are too enhanced by subjecting the halftone data in suitable data values to an appropriate masking treatment.

What is claimed is:

1. A method for generating image areas in an image processing system, comprising the steps of:

producing a binary image based on an original image input in the form of horizontal and vertical contours;

logically combining the horizontal and vertical contours with halftone image data by using logic gates to effect an image generation; and transferring image areas of the halftone image data with the horizontal and vertical image data combined by said logically combining step.

2. An apparatus for generating image areas in an image processing system comprising:

a vertical contour producer for logically combining one horizontal data of an original standard binary image data STD of a set up line and the other horizontal data of the original standard binary image data STD of a next set up line to produce a vertical contour;

a horizontal contour producer comprising a shifter, wherein said horizontal contour producer logically combines the other horizontal data of the original standard binary image data of the next set up line with a shifted original standard binary image data of the next set up line which is shifted by said shifter;

a logic combiner for logically combining outputs of the vertical and horizontal contour products and a halftone image data; and an image area transfer circuit for transferring image areas of the half tone image data with horizontal and vertical contouring data combined by the logic combiner.

3. The apparatus as claimed in claim 2, wherein said vertical contour producer comprises a parallel/serial converter for converting the stored horizontal data of the set up line of the original standard binary image data into a serial form and a first exclusive-OR gate for exclusive-ORing an output of said parallel/serial converter with said standard binary image data STD of the next set up line.

4. The apparatus as claimed in claim 2, wherein said horizontal contour producer comprises a second exclusive-OR gate for exclusive-ORing an output from said shifter and said standard binary image data of the next set up line.

5. The apparatus as claimed in claim 2, wherein said logic combiner comprises a plurality of OR gates for combining the contour outputs and the half tone image data.

* * * * *